US010798037B1

(12) United States Patent
Vadayadiyil Raveendran et al.

(10) Patent No.: US 10,798,037 B1
(45) Date of Patent: Oct. 6, 2020

(54) MEDIA CONTENT MAPPING

(71) Applicant: INTERNATIONAL BUSINESS MACHINES CORPORATION, Armonk, NY (US)

(72) Inventors: Pramod Vadayadiyil Raveendran, Bengaluru (IN); Kuntal Dey, Vasant Kunj (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,214

(22) Filed: Jun. 12, 2019

(51) Int. Cl.
*H04W 4/20* (2018.01)
*H04W 4/80* (2018.01)
*H04W 4/021* (2018.01)
*H04L 12/58* (2006.01)

(52) U.S. Cl.
CPC .............. *H04L 51/10* (2013.01); *H04W 4/021* (2013.01); *H04W 4/203* (2013.01); *H04W 4/80* (2018.02)

(58) Field of Classification Search
None
See application file for complete search history.

(56) References Cited

U.S. PATENT DOCUMENTS

| 91,669,392 | 10/2015 | Rasmussen |
| 95,214,512 | 12/2016 | Deweese |
| 2008/0066001 A1* | 3/2008 | Majors ................ H04L 12/1822 715/758 |
| 2009/0125481 A1* | 5/2009 | Mendes da Costa ... G06F 16/50 |
| 2009/0172150 A1 | 7/2009 | Alkov |
| 2018/0198743 A1 | 7/2018 | Blackstock |
| 2018/0350144 A1* | 12/2018 | Rathod .............. G06Q 20/3276 |
| 2019/0171693 A1* | 6/2019 | Dotan-Cohen ...... G06Q 10/107 |

OTHER PUBLICATIONS

Mitchell, Julian; Social Network Television: The Next Wave of Digital Entertainment; May 14, 2015; https://www.forbes.com/sites/julianmitchell/2015/05/ 14/social-network-television-is-the-next-wave-of-digital-entertainrnent/#366b I 45e75af; 8 pages.
The Social Television Network; The Future of Video is Here Now; https://stntv.com/; retrieved from the Internet Mar. 14, 2019; 3 pages.
TV WhatsApp; http://tvwhatsapp.com; retrieved from the Internet Mar. 26, 2019; 12 pages.

* cited by examiner

*Primary Examiner* — Scott B Christensen
(74) *Attorney, Agent, or Firm* — Schmeiser, Olsen & Watts; Brian M. Restauro

(57) ABSTRACT

A method and system for mapping media content is provided. The method includes detecting first media content being presented. The first media content is compared to second media content and similarities are determined. In response, are first electronic device is paired with a second electronic device and associated input content being inputted into a GUI is detected. A contextual analysis of the input content is executed and audio, video, and image data is compared to the input content. A correlation between the input content and a portion of the audio, video, and image data is determined and an associated portion is extracted from the audio, video, and image data. The portion is embedded and presented within a specified area of the GUI.

20 Claims, 8 Drawing Sheets

MEDIA CONTENT MAPPING

FIELD

The present invention relates generally to a method for mapping media content functionality and in particular to a method and associated system for improving software and communications technology associated with detecting media content and embedding the media content with specified portions of a graphical user interface.

BACKGROUND

Accurately modifying transmitted content for usage typically includes an inaccurate process with little flexibility. Modifying text software associated with display interface presentation may include a complicated process that may be time consuming and require a large amount of resources. Additionally, combining multiple content types for interface presentation may require additional human intervention.

SUMMARY

A first aspect of the invention provides a media content mapping method comprising: detecting, by a processor of a first electronic device of a first user, first media content being presented via the first electronic device; comparing, by the processor, the first media content to second media content of a second electronic device of a second user; determining, by the processor, similarities between the first media content and the second media content; automatically pairing, by the processor in response to the determining the similarities, the first electronic device to the second electronic device; detecting, by the processor, input content being inputted into and presented by a graphical user interface (GUI) of the first electronic device; executing, by the processor, a contextual analysis of the input content; comparing, by the processor based on results of the executing, audio, video, and image data being presented via the second electronic device to the input content; determining, by the processor, a correlation between the input content and a portion of the audio, video, and image data; extracting, by the processor, the portion of the audio, video, and image data from the audio video data; embedding, by the processor, the portion of the audio, video, and image data into a specified area of the GUI of the first electronic device; and presenting, by the processor to the first user, the portion within the specified area of the GUI.

A second aspect of the invention provides a computer program product, comprising a computer readable hardware storage device storing a computer readable program code, the computer readable program code comprising an algorithm that when executed by a processor of a first electronic device of a first user implements a media content mapping method, the method comprising: detecting, by the processor, first media content being presented via the first electronic device; comparing, by the processor, the first media content to second media content of a second electronic device of a second user; determining, by the processor, similarities between the first media content and the second media content; automatically pairing, by the processor in response to the determining the similarities, the first electronic device to the second electronic device; detecting, by the processor, input content being inputted into and presented by a graphical user interface (GUI) of the first electronic device; executing, by the processor, a contextual analysis of the input content; comparing, by the processor based on results of the executing, audio, video, and image data being presented via the second electronic device to the input content; determining, by the processor, a correlation between the input content and a portion of the audio, video, and image data; extracting, by the processor, the portion of the audio, video, and image data from the audio video data; embedding, by the processor, the portion of the audio, video, and image data into a specified area of the GUI of the first electronic device; and presenting, by the processor to the first user, the portion within the specified area of the GUI.

A third aspect of the invention provides a first electronic device of a first user comprising a processor coupled to a computer-readable memory unit, the memory unit comprising instructions that when executed by the processor implements a media content mapping method comprising: detecting, by the processor, first media content being presented via the first electronic device; comparing, by the processor, the first media content to second media content of a second electronic device of a second user; determining, by the processor, similarities between the first media content and the second media content; automatically pairing, by the processor in response to the determining the similarities, the first electronic device to the second electronic device; detecting, by the processor, input content being inputted into and presented by a graphical user interface (GUI) of the first electronic device; executing, by the processor, a contextual analysis of the input content; comparing, by the processor based on results of the executing, audio, video, and image data being presented via the second electronic device to the input content; determining, by the processor, a correlation between the input content and a portion of the audio, video, and image data; extracting, by the processor, the portion of the audio, video, and image data from the audio video data; embedding, by the processor, the portion of the audio, video, and image data into a specified area of the GUI of the first electronic device; and presenting, by the processor to the first user, the portion within the specified area of the GUI.

The present invention advantageously provides a simple method and associated system capable of accurately modifying transmitted content for usage.

DETAILED DESCRIPTION

Figure 1:
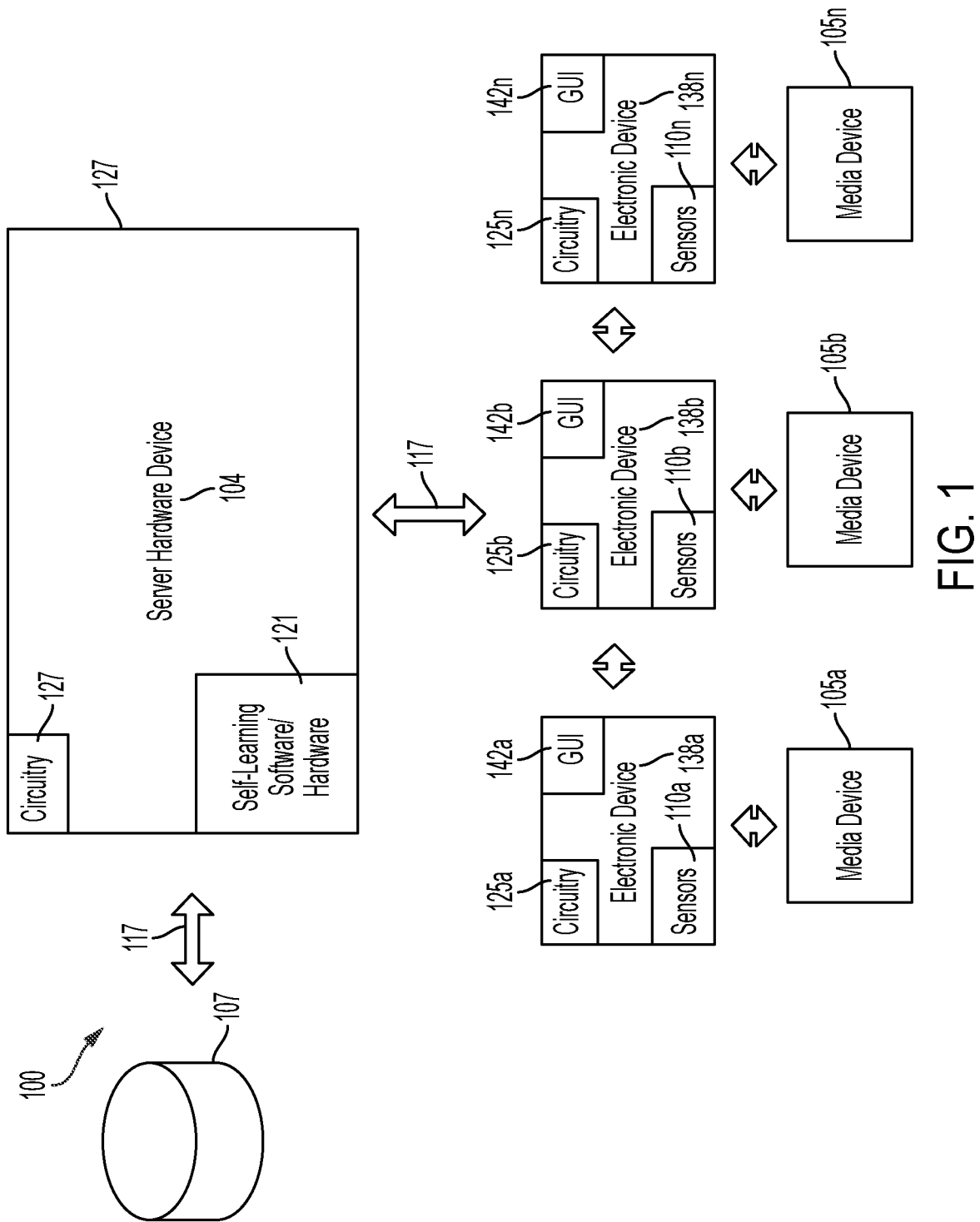
FIG. 1 illustrates a system for improving software and communications technology associated with detecting media content and embedding the media content with specified portions of a graphical user interface, in accordance with embodiments of the present invention.

FIG. 1 illustrates a system 100 for improving software and communications technology associated with detecting media content and embedding the media content with specified portions of a graphical user interface, in accordance with embodiments of the present invention. A typical communication system (for communicating via text messaging or email) may allow users to connect with each other and execute real time textual/audio/video communications. Simultaneously, multiple users may view a same visual presentation at same or different point in time. Likewise, users may discuss objects or images with in the visual presentation via the real time textual/audio/video communications. Therefore, system 100 enables a process for generating a contextual map between chat/text content and an exact position within media content thereby enabling a user to understand media content in an interesting and useful manner. Typical systems require a user to manually type or pick content from a repository or forward the content from various additional groups to a person that for communication, however context-based communication are not available in such tools. Therefore, system 100 enables an improved process for generating and embedding a contextual map of real time textual/audio/video communications within an exact position within the visual presentation thereby allowing for improved custom descriptions for the visual presentation.

System 100 enables an improved process for executing contextual two-way mapping of real time text-based content with respect to media content as follows:

1. Executing a contextual analysis process with respect to text (e.g., chat) content (or voice content retrieved via a phone call) and relating results to associated media content. A process for accessing and/or retrieving text (e.g., chat) content, voice content retrieved via a phone call, and associated media content may be executed based on an approval by a user(s). The approval may additionally include a user's option to cancel such accessing and/or retrieving, and thus opt/in and opt/out of accessing and/or retrieving the aforementioned communications at the user's discretions. Further, any data collected is understood to be intended to be securely stored and unavailable without authorization.

2. Pointing to an object image (relevant to the results of the contextual analysis) within the media and selecting a boundary area.

3. Highlighting a portion of the media (in context) with respect to its relationship with multiple user discussions. The highlighted portion is displayed on a text GUI of all users.

Figure 5:
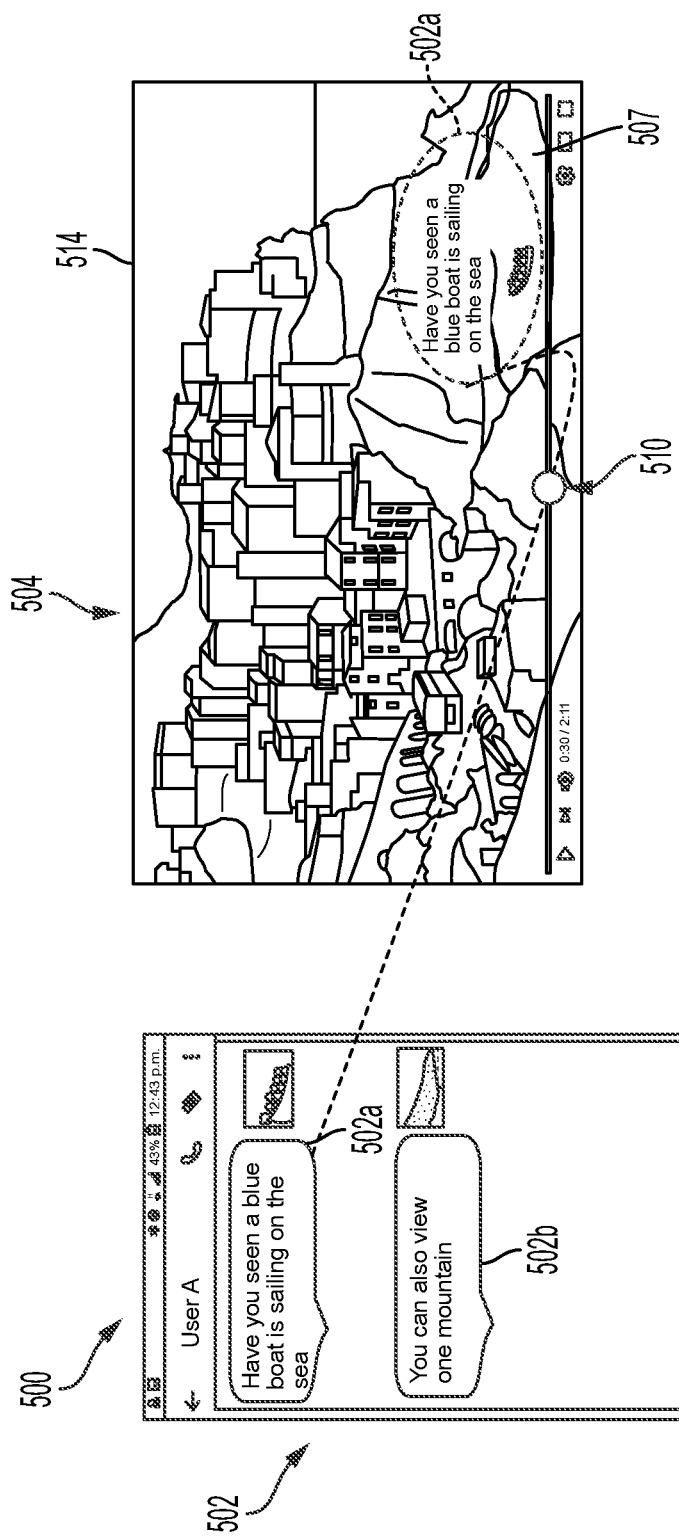
FIG. 5 illustrates an implementation example associated with a process for presenting thumbnail images of contextually related media, in accordance with embodiments of the present invention.

System 100 executes a process for performing contextual two-way mapping of real time text (or voice) content with media content with respect to spatial (locational), temporal, and attribute-level features to execute the mapping process. For example, if real time chat application content is related to media content being viewed or navigated (e.g., TV, internet video, live sports, etc.) by a user, then system 100 performs a contextual analysis of the chat content with respect to the media content is and subsequently the chat content is rendered at a specified position on a media display screen (e.g. as illustrated in FIG. 5, infra) or via augmented reality glasses. Additionally, results of the contextual two-way mapping process are enabled to highlight appropriate relevant boundaries or pin point a specified location on the media display screen with respect to the chat content thereby illustrating the chat content mapped to the media content. If any real-time chat content is determined to be related to the media content, then system 100 will highlight the portion of the media content within a video progress bar to present mapping locations. Likewise, a thumbnail of the appropriate media portion from the media display screen may be presented in combination with a real time chat window such that a two way mapping with chat and media contents may be presented to the user to describe contents related to the media content being discussed. System 100 is configured to compare attributes of relative objects in context and present useful directions for communication (e.g., information describing accident prone areas, information describing locations of objects, an approximate distance between two points, a mode of transportation for traveling between two points, etc.). Alternatively, a user may implement augmented reality glasses to execute a process for performing contextual two-way mapping of real time voice content with media content via voice conversation. Therefore, results of the contextual two-way mapping process may be presented via the augmented reality glasses.

System 100 of FIG. 1 includes a server hardware device 104 (i.e., specialized hardware device), electronic devices 138a . . . 138n, media devices 105a . . . 105n, and a database 107 (e.g., a cloud-based system) interconnected through a network 117. Server hardware device 104 includes specialized circuitry 127 (that may include specialized software) and self-learning software code/hardware structure 121 (i.e., including self-learning software code). Media devices may include any type of device for presenting visual media including, inter alia, a television, a computer, a monitor, etc. Electronic devices 138a . . . 138n may include personal devices (e.g., smart phones, tablet computers, etc.) provided to each user. Electronic devices 138a . . . 138n may be Bluetooth enabled to provide connectivity to each other and any type of system. Electronic device 138a includes specialized circuitry 125a (that may include specialized software), sensors 110a, and a GUI 142a. Electronic device 138b includes specialized circuitry 125b (that may include specialized software), sensors 110b, and a GUI 142b. Electronic device 138n includes specialized circuitry 125n (that may include specialized software), sensors 110n, and a GUI 142n. Sensors 110a . . . 110n may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Server hardware device 104 and electronic devices 138a . . . 138n may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104 and electronic devices 138a . . . 138n may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and communications technology associated with detecting media content and embedding the media content with specified portions of a graphical user interface. Network 117 may include any type of network including, inter alia, a local area network, (LAN), a wide area network (WAN), the Internet, a wireless network, etc. Alternatively, network 117 may include an application programming interface (API).

System 100 enables the following process for mapping real time chat content with media content:
1. Executing a contextual analysis of chat content and relating the chat content to associated media content.
2. Pointing to an object image (relevant to the context) within the media content and selecting boundary areas depending on attributes of the chat discussion.
3. Highlighting a portion of the media content (in context) depending on its relation to chat discussions between multiple users. The highlighted portions are displayed on a chat screen GUI of the multiple parties. Additionally, select areas within the media content are modified and placed within different areas of the media content dependent on a context of the chat discussion or according to a progress of the chat discussion.

A mapping process is initiated when devices being used for video content viewing and online chatting are paired as follows:

Adjacent devices are identified via usage of near field communications (NFC). The devices are identified as video presentation devices chatting devices. Subsequently, the devices communicate with each other to locate topic similarities within chat content. During a real time chat process occurring while viewing video content within media devices (e.g., TV, laptop, etc), the chat devices and video presentation devices are paired with each other (e.g., mobile devices being paired with a TV). In response to a user's interaction with a mobile device, the mobile device will identify the user as performing a real time chatting process. In response, system 100 executes a real time analysis of chat contents and identifies a topic of discussion. Accordingly, content of the video presentation is identified.

The chat content is associated with the video presentation as follows:
At any given time t, system 100 captures a snapshot of a video screen and executes an object extraction process for determining object interaction. Likewise, within a threshold of chat history, system 100 analyzes the chat logs to extract keywords and/or concepts and identify discussion concepts and interaction dynamics of the concepts. Identified concepts and image object correlation processes are be validated to identify content is being discussed with respect to an image displayed in a video screen. During analysis (of the chat content in real time) system 100 identifies if any chat content is related to video content currently being presented. Likewise, system 100 identifies a portion of the video content with respect to chat discussions via execution of contextual analysis of the chat content.

Video content is mapped as follows:
System 100 identifies a portion of an image (of the video content) being discussed (via a real-time chat process) and accordingly a boundary of the portion of the image is identified. The image is analyzed to identify the portion of the image being discussed via the chat process. Subsequently, the boundary from the portion of the image portion is extracted and presented with the real-time chat content so additional users of the real-time chat process may identify the portion of the image being discussed.

In response to the video content mapping process, text based content (from the chat process) to be rendered the portion of the image is identified as follows:
The text based chat content is overlaid over displayed video content such that a user viewing the video content may identify which portion of the video content is being discussed during a real-time chat process. Therefore, participants the real-time chat process may proceed to an associated video portion related to the chat content and correlate the chat content with the video content. Subsequently, system 100 will label a segment of the chat content and an associated segment of video (all or some of the frames) as correlated.

Figure 2:
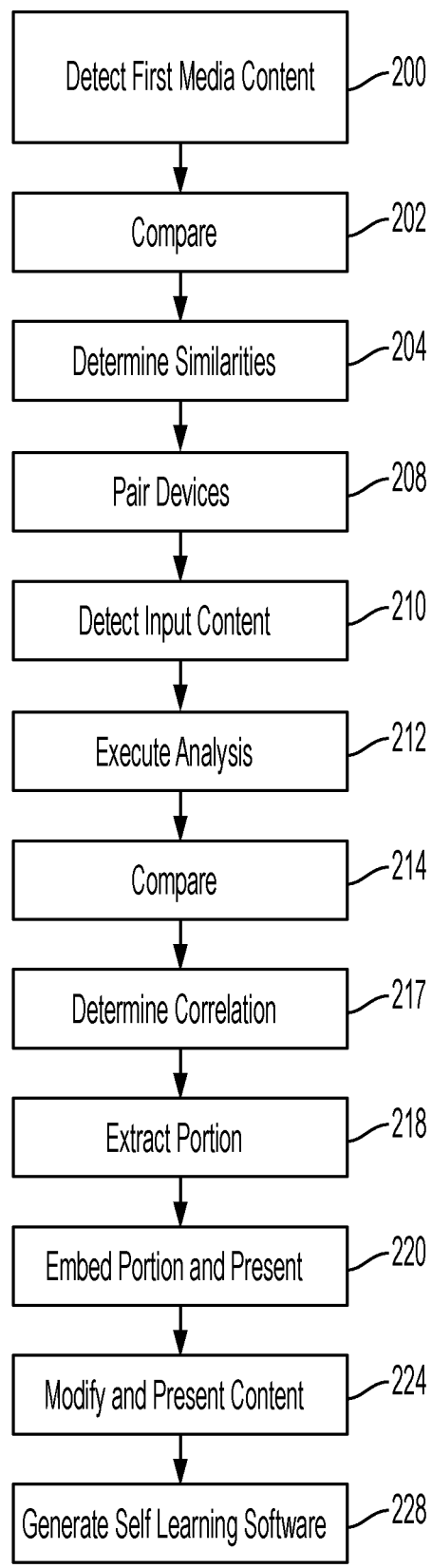
FIG. 2 illustrates an algorithm detailing a process flow enabled by the system of FIG. 1 for improving software and communications technology associated with detecting media content and embedding the media content with specified portions of a graphical user interface, in accordance with embodiments of the present invention.

FIG. 2 illustrates an algorithm detailing a process flow enabled by system 100 of FIG. 1 for improving software and communications technology associated with detecting media content and embedding the media content with specified portions of a graphical user interface, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and electronic devices 138*a* . . . 138*n*. In step 200, first media content being presented via a first electronic device (e.g., a communication device) of a first user is detected. In step 202, the first media content is compared to second media content of a second electronic device (e.g., a video presentation device) of a second user. In step 204, similarities between the first media content and the second media content are determined. In step 208, the first electronic device is paired (e.g., via Bluetooth) with the second electronic device in response to step 204. In step 210, input content being inputted into and presented by a graphical user interface (GUI) of the first electronic device is detected. In step 212, a contextual analysis of the input content is executed. In step 214, audio, video, and image data being presented via the second electronic device is compared to the input content based on results of step 212. In step 217, a correlation between the input content and a portion of the audio, video, and image data is determined. Determining the correlation may include: determining that the input content refers to a specified visual object of the portion of the audio, video, and image data; determining that the input content refers to a specified location of a presentation interface of the portion of the audio, video, and image data; determining that the input content refers to a context of the portion of the audio, video, and image data; and/or determining that the input content refers to an audio pattern of the portion of the audio, video, and image data.

In step 218, the portion of the audio, video, and image data is extracted from the audio, video, and image data. In step 220, the portion of the audio, video, and image data is embedded into a specified area of the GUI of the first electronic device. The portion of the audio, video, and image data is presented within the specified area of the GUI. In step 224, the audio, video, and image data is modified and presented to the first and second user as described in the following configurations:

A first configuration includes overlaying the input content over the specified area of the GUI and presenting the input content overlaying the specified area of the GUI.

A second configuration includes comparing attributes of visual objects of the audio, video, and image data; generating communications associated with the visual objects; and presenting the communications to the first user and the second user. The communications may include information associated with accident prone locations, distances, and/or transportation modes.

A third configuration includes determining similarities between the input content and the first media content and the second media content. An additional contextual analysis of the input content with respect to the first media content and the second media content is executed and the input content is presented within a specified position of the GUI.

A fourth configuration includes determining similarities between the input content and the first media content and the second media content and a highlighted portion of the first media content or the second media content is presented within a progress bar of the GUI. Additionally, a thumbnail image of the first media content or the second media content may be presented with respect to a real time window for presenting the input content.

In step 228, self-learning software code for executing future media content mapping and embedding processes is generated based on results of step 214.

Figure 3:
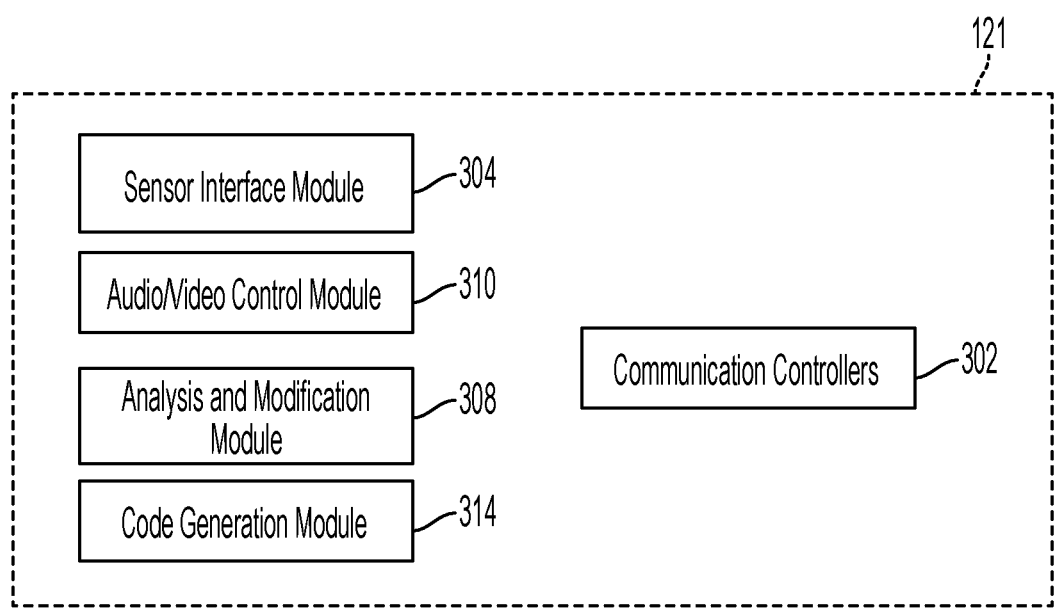
FIG. 3 illustrates an internal structural view of the self-learning software/hardware structure of FIG. 1, in accordance with embodiments of the present invention.

FIG. 3 illustrates an internal structural view of a self-learning software/hardware structure 121 (and/or circuitry 125a . . . 125n), in accordance with embodiments of the present invention. Self-learning software/hardware structure 121 includes a sensor interface module 304, an audio video control module 310, an analysis and modification module 308, a code generation module 314, and communication controllers 302. Sensor interface module 304 comprises specialized hardware and software for controlling all functions related to sensors 110 and 110a . . . 110n of FIG. 1. Audio video control module 310 comprises specialized hardware and software for controlling all functionality related to media devices 105a . . . 105n for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating self-learning software code for executing future media content mapping processes. Communication controllers 302 are enabled for controlling all communications between sensor interface module 304, audio video control module 310, analysis and modification module 308, and code generation module 314.

Figure 4:
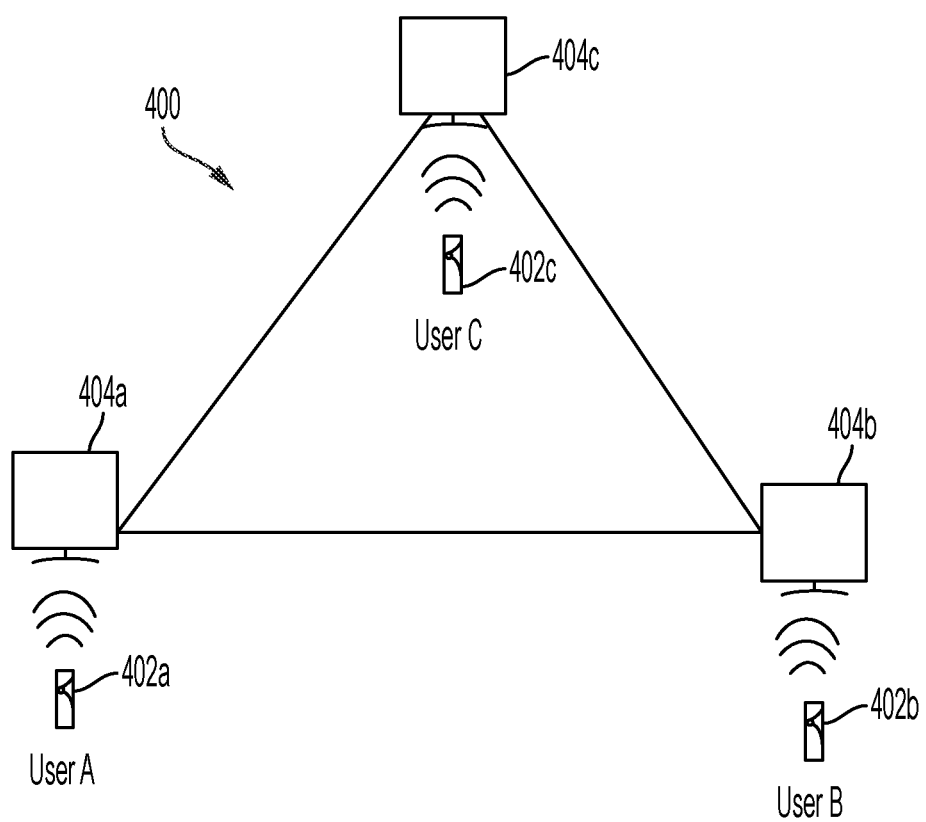
FIG. 4 illustrates an implementation example associated with a process for improving software and communications technology associated with detecting media content and embedding the media content with specified portions of a graphical user interface, in accordance with embodiments of the present invention.

FIG. 4 illustrates the following implementation example 400 associated with a process for improving software and communications technology associated with detecting media content and embedding the media content with specified portions of a graphical user interface, in accordance with embodiments of the present invention. The process is initiated when a display device(s) (e.g., display device 404a . . . 404c) is paired with mobile devices (e.g., devices 402a . . . 402c) of respective users (e.g., user A . . . user C). Similarities of between media contents displayed on the display device and text communications between the mobile devices are determined via usage of contextual analysis processes. The determined similarities enable the display device(s) and the mobile devices to be paired. For example, mobile device 402a and display device 404a are paired for user A. Likewise, mobile device 402b and display device 404b are paired for user B and mobile device 402c and display device 404c are paired for user C. It is determined that the participating users (User A, B, C,) are discussing media content and have formed a chat group. Therefore, during a real-time chat between Users A, B, and C, each respective user's mobile device analyzes content beinging inputted by each user. Each content being inputted is contextually be compared with media content of the display devices 404a . . . 404c. In response, each paired mobile device and associated display device identifies static image or video being displayed and any detected correlation between textual content (of a mobile device) and media content (of a display device) is identified if a user is: referring a point in a displayed image; referring to an area range in the displayed image; referring a context from the displayed content; and/or referring a sound pattern. Therefore, media content may be image snipped, an entire frame, a series of image frames (e.g., a video clip) or an audio file. Subsequently, complete textual chat content is analyzed and a portion of the media content being referred to is identified and extracted from associated media portions. Additionally, the identified media content portion is extracted from the media being displayed and is automatically embedded within real-time textual communication chat content. For example, user A composed textual chat content and transmitted the textual chat content to user B and C such that additional participants receive the media contents along with the chat content.

In an additional embodiment, chat content is transmitted to a receiving party and an associated mobile device and display device of the receiving party (e.g. User B and C) executes contextual analysis of content is being displayed on the display device. Accordingly (if any contextually related information is located), then the associated display device is overlaid with chat content in a same location where the comment was posted by the transmitting party. Additionally, historical real time textual chat data and extracted media portions are retrieved for executing a machine learning technique for predicting a media portion for extraction thereby allowing the system to proactively extract media contents to reduce a time lag associated with the process.

FIG. 5 illustrates the following implementation example associated with a process for presenting thumbnail images of contextually related media, in accordance with embodiments of the present invention. The process is initiated when a user A initiates a chat session 502 (including chat content 502a of user A and 502b of user B) while viewing display content 504. In response to a contextual analysis process a boundary 507 (related to the chat session content) is highlighted and chat content 502a is placed on the display content 504 at a location of the boundary 507. Likewise, future related chat content may be placed over a scrollbar 510 of a display 514.

Figure 6:
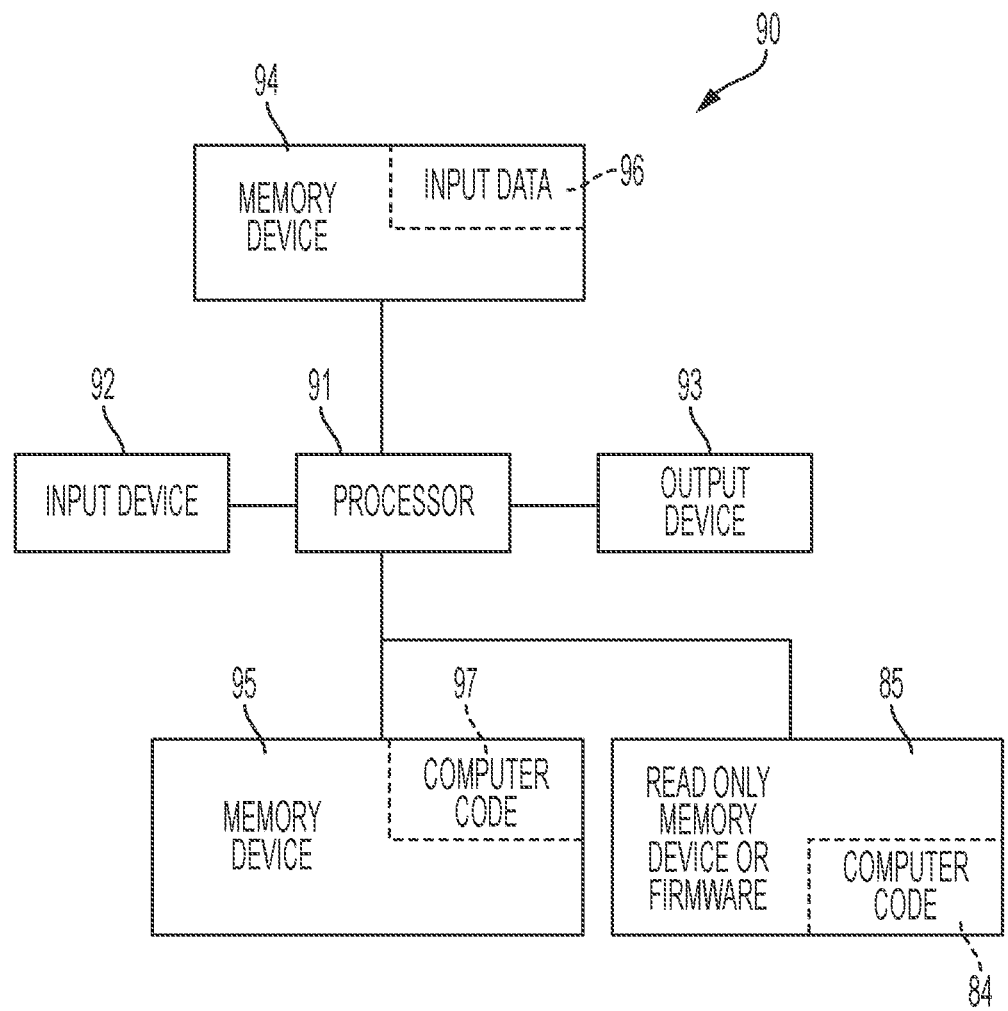
FIG. 6 illustrates a computer system used by the system of FIG. 1 for improving software and communications technology associated with detecting media content and embedding the media content with specified portions of a graphical user interface, in accordance with embodiments of the present invention.

FIG. 6 illustrates a computer system 90 (e.g., electronic devices 138a . . . 138n and/or server hardware device 104 of FIG. 1) used by or comprised by the system of FIG. 1 for improving software and communications technology associated with detecting media content and embedding the media content with specified portions of a graphical user interface, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91.

The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and communications technology associated with detecting media content and embedding the media content with specified portions of a graphical user interface. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and communications technology associated with detecting media content and embedding the media content with specified portions of a graphical user interface. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and communications technology associated with detecting media content and embedding the media content with specified portions of a graphical user interface. In another embodiment, the invention provides a business method that performs the process steps of the invention on a subscription, advertising, and/or fee basis. That is, a service supplier, such as a Solution Integrator, could offer to enable a process for improving software and communications technology associated with detecting media content and embedding the media content with specified portions of a graphical user interface. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
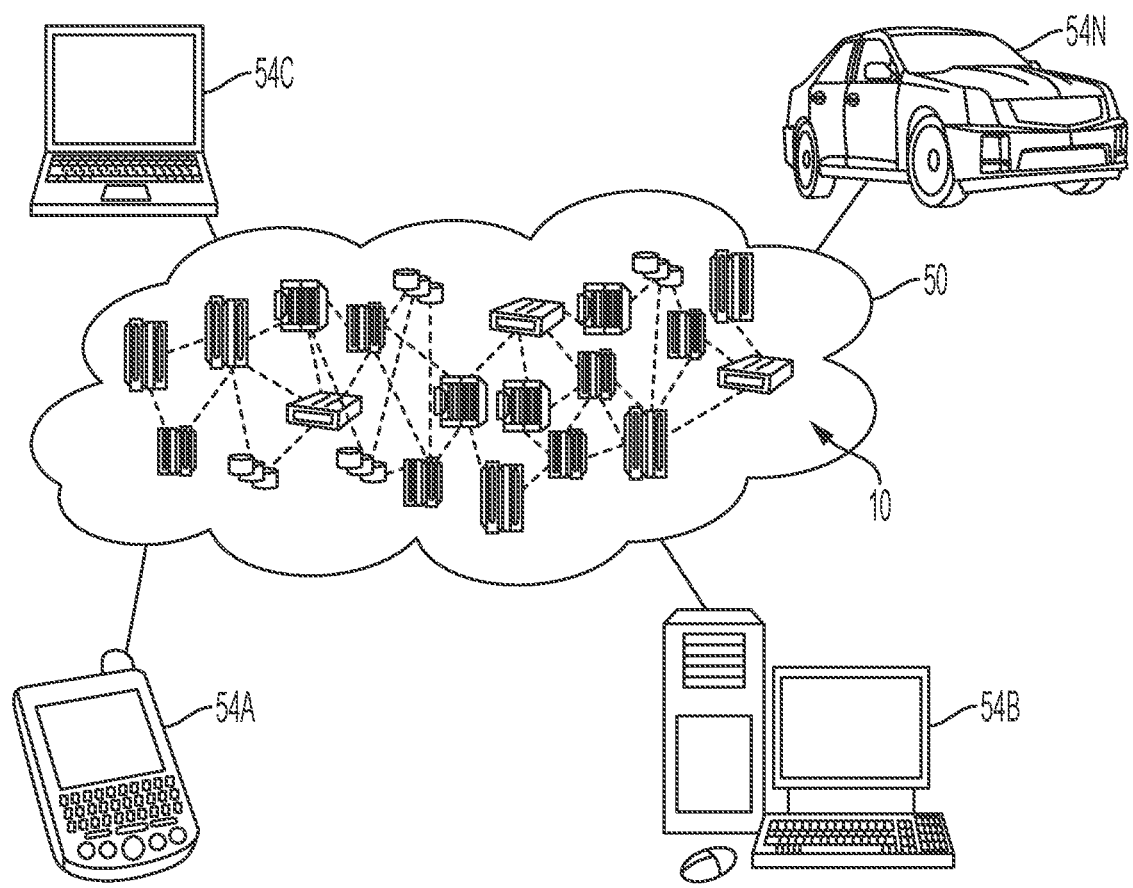
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
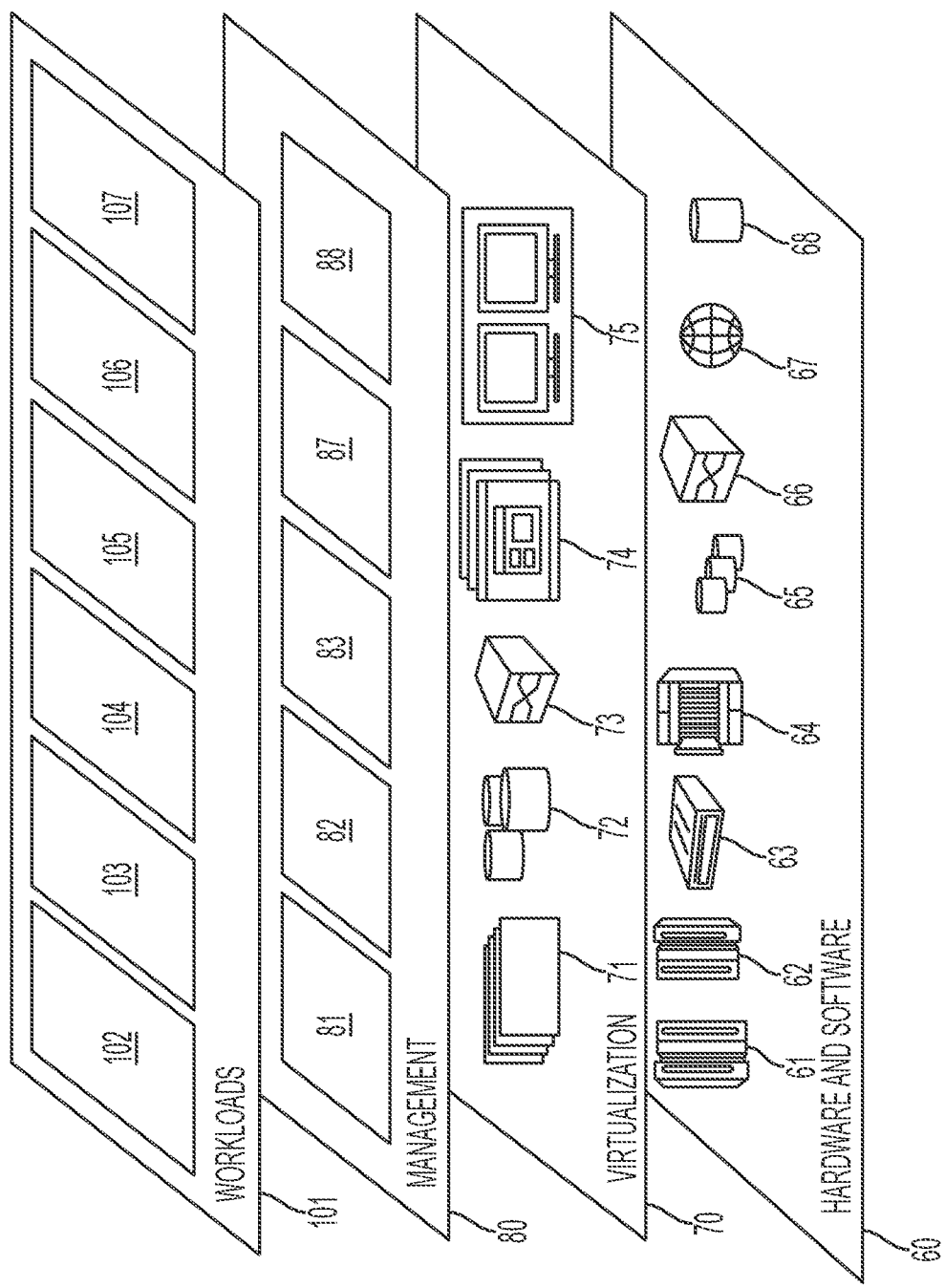
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software and communications technology associated with detecting media content and embedding the media content with specified portions of a graphical user interface 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A media content mapping method comprising:
detecting, by a processor of a first electronic device of a first user, first media content being presented via said first electronic device;
comparing, by said processor, said first media content to second media content of a second electronic device of a second user;
determining, by said processor, similarities between said first media content and said second media content;

automatically pairing, by said processor in response to said determining said similarities, said first electronic device to said second electronic device;

detecting, by said processor, input content being inputted into and presented by a graphical user interface (GUI) of said first electronic device;

executing, by said processor, a contextual analysis of said input content;

comparing, by said processor based on results of said executing, audio, video, and image data being presented via said second electronic device to said input content;

determining, by said processor, a correlation between said input content and a portion of said audio, video, and image data;

extracting, by said processor, said portion of said audio, video, and image data from said audio, video, and image data;

embedding, by said processor, said portion of said audio, video, and image data into a specified area of said GUI of said first electronic device; and presenting, by said processor to said first user, said portion within said specified area of said GUI.

2. The method of claim 1, further comprising:
overlaying, by said processor, said input content over said specified area of said GUI of said first electronic device; and
presenting, by said processor to said first user, said input content overlaying said specified area of said GUI.

3. The method of claim 1, further comprising:
comparing, by said processor, attributes of visual objects of said audio, video, and image data;
generating, by said processor, communications associated with said visual objects; and
presenting, by said processor, said communications to said first user and said second user.

4. The method of claim 3, wherein said communications comprise information selected from the group consisting of accident prone locations, distances, and transportation modes.

5. The method of claim 1, further comprising:
generating, by said processor based on results of said comparing said audio, video, and image data, said determining, and said extracting, self-learning software code for executing future media content mapping processes.

6. The method of claim 1, wherein said first electronic device comprises a communication device, and wherein said second electronic device comprises a video presentation device.

7. The method of claim 1, wherein said determining said correlation comprises:
determining, by said processor, that said input content refers to a specified visual object of said portion of said audio video data.

8. The method of claim 1, wherein said determining said correlation comprises:
determining, by said processor, that said input content refers to a specified location of a presentation interface of said portion of said audio, video, and image data.

9. The method of claim 1, wherein said determining said correlation comprises:
determining, by said processor, that said input content refers to a context of said portion of said audio, video, and image data.

10. The method of claim 1, wherein said determining said correlation comprises:

determining, by said processor, that said input content refers to an audio pattern of said portion of said audio, video, and image data.

11. The method of claim 1, further comprising:
determining, by said processor, similarities between said input content and said first media content and said second media content;
executing, by said processor, an additional contextual analysis of said input content with respect to said first media content and said second media content; and
presenting, by said processor based on said additional contextual analysis, said input content within a specified position of said GUI.

12. The method of claim 1, further comprising:
executing, by said processor, an additional contextual analysis of said input content with respect to said first media content and said second media content;
locating, by said processor based on results of said additional contextual analysis, a portion of said GUI relevant to said input content; and
presenting, by said processor, an indicator associated with said portion of said GUI.

13. The method of claim 1, further comprising:
determining, by said processor, similarities between said input content and said first media content and said second media content; and
presenting, by said processor, a highlighted portion of said first media content or said second media content within a progress bar of said GUI.

14. The method of claim 1, further comprising:
presenting, by said processor, a thumbnail image of said first media content or said second media content with respect to a real time window for presenting said input content.

15. The method of claim 1, further comprising:
providing at least one support service for at least one of creating, integrating, hosting, maintaining, and deploying computer-readable code in the control hardware, said code being executed by the computer processor to implement: said detecting said first media contents, said comparing said first media contents, said determining said similarities, said automatically pairing, said detecting said input content, said executing, said comparing said audio, video, and image data, said determining said correlation, said extracting, said embedding, and said presenting.

16. A computer program product, comprising a computer readable hardware storage device storing a computer readable program code, said computer readable program code comprising an algorithm that when executed by a processor of a first electronic device of a first user implements a media content mapping method, said method comprising:
detecting, by said processor, first media content being presented via said first electronic device;
comparing, by said processor, said first media content to second media content of a second electronic device of a second user;
determining, by said processor, similarities between said first media content and said second media content;
automatically pairing, by said processor in response to said determining said similarities, said first electronic device to said second electronic device;
detecting, by said processor, input content being inputted into and presented by a graphical user interface (GUI) of said first electronic device;
executing, by said processor, a contextual analysis of said input content;

comparing, by said processor based on results of said executing, audio, video, and image data being presented via said second electronic device to said input content;
determining, by said processor, a correlation between said input content and a portion of said audio, video, and image data;
extracting, by said processor, said portion of said audio, video, and image data from said audio, video, and image data;
embedding, by said processor, said portion of said audio, video, and image data into a specified area of said GUI of said first electronic device; and
presenting, by said processor to said first user, said portion within said specified area of said GUI.

17. The computer program product of claim 16, wherein said method further comprises:
overlaying, by said processor, said input content over said specified area of said GUI of said first electronic device; and
presenting, by said processor to said first user, said input content overlaying said specified area of said GUI.

18. The computer program product of claim 16, wherein said method further comprises:
comparing, by said processor, attributes of visual objects of said audio, video, and image data;
generating, by said processor, communications associated with said visual objects; and
presenting, by said processor, said communications to said first user and said second user.

19. The computer program product of claim 18, wherein said communications comprise information selected from the group consisting of accident prone locations, distances, and transportation modes.

20. A first electronic device of a first user comprising a processor coupled to a computer-readable memory unit, said memory unit comprising instructions that when executed by the processor implements a media content mapping method comprising:
detecting, by said processor, first media content being presented via said first electronic device;
comparing, by said processor, said first media content to second media content of a second electronic device of a second user;
determining, by said processor, similarities between said first media content and said second media content;
automatically pairing, by said processor in response to said determining said similarities, said first electronic device to said second electronic device;
detecting, by said processor, input content being inputted into and presented by a graphical user interface (GUI) of said first electronic device;
executing, by said processor, a contextual analysis of said input content;
comparing, by said processor based on results of said executing, audio, video, and image data being presented via said second electronic device to said input content;
determining, by said processor, a correlation between said input content and a portion of said audio, video, and image data;
extracting, by said processor, said portion of said audio, video, and image data from said audio, video, and image data;
embedding, by said processor, said portion of said audio, video, and image data into a specified area of said GUI of said first electronic device; and
presenting, by said processor to said first user, said portion within said specified area of said GUI.

* * * * *